Nov. 21, 1967  B. MOUISSIE  3,353,763
MEANS FOR LOCKING AND UNLOCKING THE SPOOL OF A FILM MAGAZINE
Filed Oct. 21, 1965  3 Sheets-Sheet 3
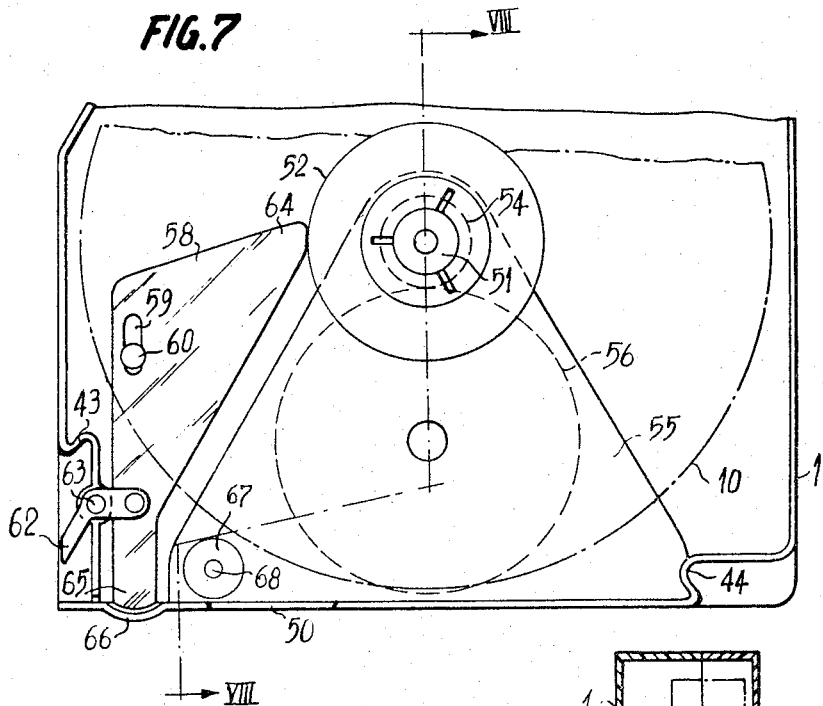
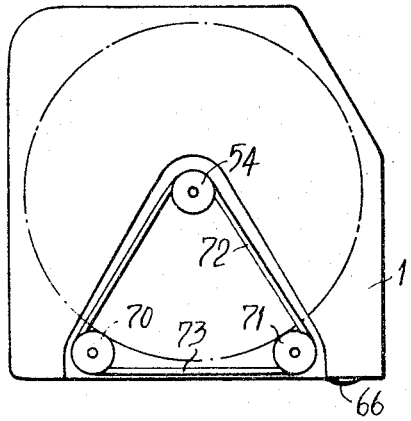
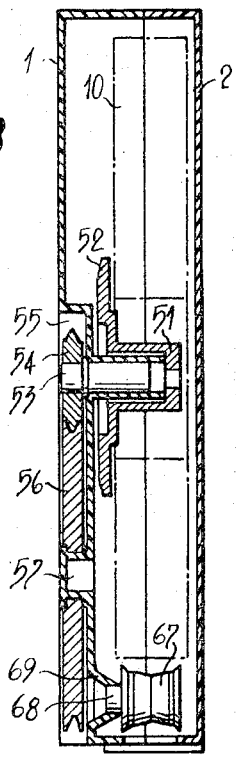
INVENTOR
Bob Mouissie
BY Emory L. Groff Jr.
ATTORNEY

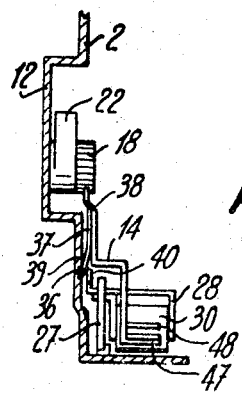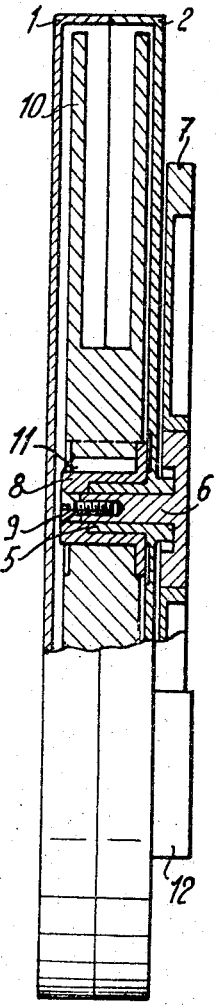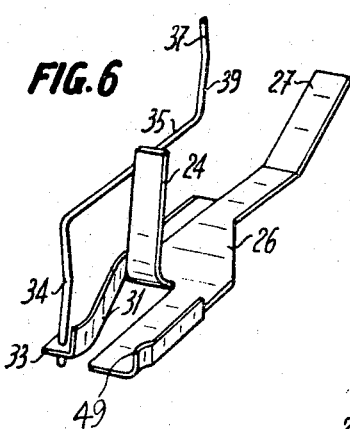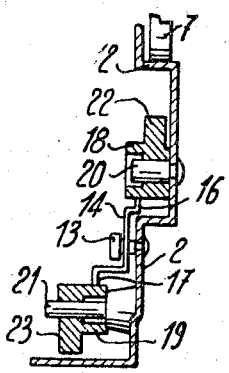

United States Patent Office 3,353,763
Patented Nov. 21, 1967

3,353,763
MEANS FOR LOCKING AND UNLOCKING THE SPOOL OF A FILM MAGAZINE
Bob Mouissie, Yverdon, Switzerland, assignor to Paillard S.A., Vaud, Switzerland, a corporation of Switzerland
Filed Oct. 21, 1965, Ser. No. 499,951
Claims priority, application Switzerland, June 24, 1965, 8,981/65
2 Claims. (Cl. 242—55.13)

ABSTRACT OF THE DISCLOSURE

A film spool magazine for use with a kinematographic projector, which magazine includes means for locking the spool against rotation and means for automatically unlocking the locking means when the magazine is placed in operative position on the projector. A roller mounted on the projector extends into an opening in the casing and is in engagement with the film as it is being withdrawn from the magazine. When the end of the film is reached, it becomes taut and urges the roller out of the casing permitting release of means within the casing to activate the spool locking means and again lock the spool against rotation.

---

The present invention has for its object a magazine for kinematographic films, which magazine includes a casing containing a spool for the winding of the film to be projected.

Magazines of such a type are already known, primarily for enclosing an endless loop adapted to continuously ensure the repeated projection of the same film. Such magazines are commonly used in the case of advertising films and contain various drawbacks. As a matter of fact, they can carry only a well-defined type of spool which has to be introduced into the magazine by a skilled operator, while the capacity of the spool is limited.

The present invention has for its object to allow even an unskilled operator to load a magazine of a large capacity adapted to be readily inserted in the projector, while allowing a very large reduction in the number of operations to be executed when positioning a film in a projector.

The improved magazine according to the invention includes a mechanism for locking the spool, said mechanism capable of being brought automatically into an unlocked position by the attachment of the magazine to a projector.

Figure 2:
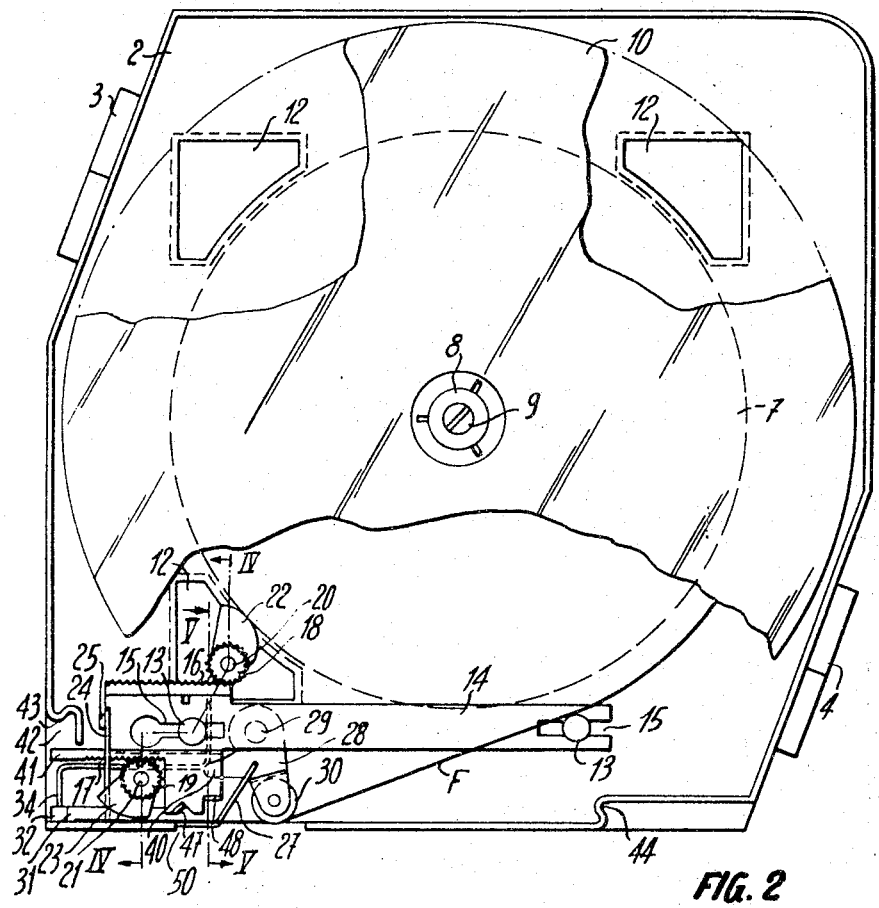
Figure 3:
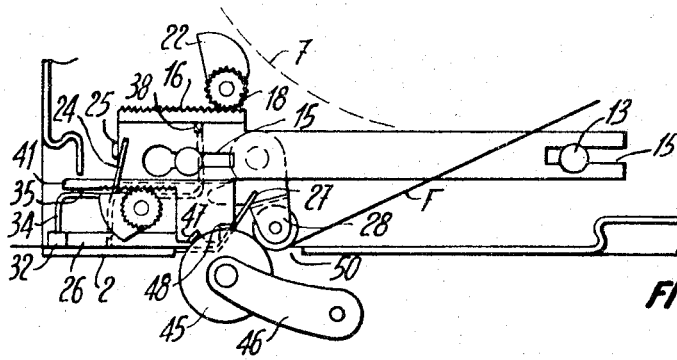

The accompanying drawings illustrate diagrammatically and by way of example two embodiments of said improved magazine. In said drawings:

FIG. 1 is a side view, partly in section of a first embodiment of my magazine,

FIG. 2 is a side view, partly in section of the same magazine illustrated in its inoperative position, FIG. 3 shows a detail of FIG. 2, the magazine being in its operative position, FIGS. 4 and 5 are cross-sections through lines IV—IV and V—V respectively of FIG. 2, FIG. 6 is a perspective view of two springs incorporated with the magazine, FIG. 7 is a view of a portion of a second embodiment, the magazine being shown in its open condition, FIG. 8 is a cross-section through line VIII—VIII of FIG. 7, FIG. 9 illustrates a modification.

As shown in FIGS. 1 and 2, the magazine includes a casing comprising two sections 1 and 2, made of molded synthetic resin and adapted to be secured to each other by a notched arrangement provided in the clasps 3 and 4. The section 2 carries a short axial sleeve 5 forming a bearing for a pivot 6 carrying a wheel 7 extending over the outer surface of said section 2.

The pivot 6 also carries a hub 8 secured thereto by a screw 9 and adapted to carry a feed spool 10 for a kinematographic film. Said film may be of a conventional commercial type and to this end the hub 8 is provided with a projecting section 11 adapted to engage a slot in the spool, so as to rigidly secure the latter to the hub 8 to make it revolve in unison with the latter.

The wheel 7 is adapted to be driven frictionally by a roller which is not illustrated, said roller being carried by the projector which is to receive the magazine.

The section 2 of the casing is provided with four projections 12 (FIG. 2) adapted to protect the wheel 7. Said section is also provided with two studs 13 serving as guides for a slider 14 which is provided with two slots 15 engaged by the studs 13 and with two toothed edges 16 and 17 each forming a rack engaging a corresponding pinion 18 or 19.

As illustrated in FIG. 4, the pinion 18 is revolvably carried by a stud 20 rigid with the section 2 of the casing, while the pinion 19 is revolvably carried in a similar manner by another stud 21 also rigid with said section.

The pinion 18 is rigid with a projection 22 forming a brake shoe adapted to cooperate with the periphery of the wheel 7 through an opening in the section 2 whereas the pinion 19 is rigid with a shoe 23 adapted to cooperate with the free end of the film F, so as to lock the latter in position whenever the magazine is not in use.

It should be noted that the shoes 22 and 23 are identical but are fitted in reversed positions with reference to each other. The racks 16–17 formed on the slider 14 are held in the inoperative position illustrated in FIG. 2, by an elastic blade 24, the free end of which engages a folded lug 25 on said slider 14 while its other end forms an extension of a member 26 illustrated in perspective view in FIG. 6. Said member 26 is provided with a rear end 27 also forming an elastic blade acting on a lever 28 pivotally secured at 29 on the section 2 and carrying a roller 30 the function of which will be disclosed hereinafter.

The front end of the member 26 also forms a further spring blade or feeler 31 carrying a boss 32 which exerts an elastic pressure on the edge of the film, so as to guide the latter and to urge its opposite edge against an abutment 49 formed on the member 26.

Said feeler 31 of the member 26 includes a lug 33 a part of which is engaged by the end 34 of a bent steel wire, of which the medial portion 35 is fitted in a groove 36 of the casing section 2. The outer end 37 of said steel wire is adapted to engage a notch 38 (FIG. 5) in the slider 14 to provide latch means for retaining the slider in the position shown in FIG. 3.

Said steel wire is also provided with a slope 39 cooperating with the nose 40 on the lever 28 carrying the roller 30, so as to release the end 37 of the wire out of the notch 38 in the slider 14.

The slider 14 includes an extension providing a release member 41 passing through the wall of the section 2 and disposed within a recess 42 formed in the wall of said section 2. Said recess includes an incurved wall portion 43 adapted to guide the magazine with reference to the projector, in cooperating relationship with abutments, not illustrated, formed on said projector. The casing is also provided with a second recess 44 also adapted to cooperate with means provided on the projector, so as to assure securing of the magazine in position during projection.

When the magazine is to be loaded, it is first opened and the operator may then introduce into it a film spool, carrying for instance a film of a length of 120 meters in the case of a 8 mm. film. The free end of said film is inserted underneath the roller 30 and underneath the shoe 23 which holds it in position, after which the casing may be closed.

During projection, the magazine loaded with the film is fitted on a suitable projector provided with guiding means engaging on the one hand the incurved wall portion or ridge 43 and on the other hand the recess 44. The kinematographic projector is then started operating and its operation may in fact be controlled automatically by the positioning of the magazine on the projector which is caused to pivot round the ridge 43. To this end, it is sufficient to provide a starting key on the projector, which key is depressed by the magazine when the latter is set in position on the projector.

The projector carries a pusher member which is shifted into contact with the release member 41 of the slider 14 which causes the latter to slide towards the right hand side of FIG. 2. The slider 14 then assumes the position illustrated in FIG. 3 so as to make the shoes 22 and 23 carried by the pinions 18 and 19 pivot whereby the wheel 7 is released together with the end of the film F.

The projector is provided with a driving roller 45 illustrated in FIG. 3. Said roller is carried by a pivoting arm 46 and is provided with a peripheral rubber coat so as to ensure the driving of the film and to urge the latter out of the magazine. Said roller 45 may recede inside an opening 50 provided in the sections 1 and 2 of the casing as a consequence of a pivotal movement of the arm 46 which is controlled by means not illustrated, whereby the film is urged against the two incurved lugs 47 and 48 formed on the slider 14 and against the roller 30.

Said roller 45 is driven counterclockwise and urges the free end of the film out of the magazine, said free end being held transversely between the boss 32 on the feeler 31 and said abutment 49. When the film engages the boss 32 at the end of the feeler 31, it shifts the latter together with the end 34 of the steel wire latch means which passes through the port in the lug 33. Said shifting causes the steel wire to pivot, the end 37 of said wire then engaging the notch 38 in the slider 14, so as to lock the latter in the position illustrated in FIG. 3.

The film is thus brought into the automatic positioning means formed on the projector. Said automatic positioning means are not described nor illustrated, since they may be of any well-known type.

As soon as the film is positioned on the projector, it is automatically drawn off the spool 7 during the projection which is performed without any difficulty since the shoes 22 and 23 are no longer in their operative locking position. The pusher member which had acted on the release member 41 of the slider 14 is collapsed at the beginning of the projection, but the slider remains in the position illustrated in FIG. 3, for which position it is locked by the end 37 of the steel wire.

The inner convolution of the film wound round the spool 10 is secured to the hub of said spool and consequently, at the end of the projection of the film, the latter is subjected to a comparatively high tensioning, since it is held fast by the hub of the spool 10 and it is simultaneously unwound by the take up spools, not illustrated, carried by the kinematographic projector. Said tensioning results in pushing the roller 45 out of the opening 50 in the magazine casing and then causing the arm 28 carrying the roller 30 to pivot clockwise.

The shifting of the roller 45 may serve for controlling the stopping of the projector, whereas the shifting of the arm 28 carrying the roller 30 produces the release of the slider 14 by means of the nose 40 on the arm 28 which nose is in contact with the slope 39 on the steel wire, of which the end 37 had originally locked the slideway 14. As a matter of fact, said end 37 passes out of the notch 38 so that the slider is returned under the action of the elastic blade 24 into the position illustrated in FIG. 2.

After its projection, the film has to be rewound inside its magazine, which is performed through a roller, not illustrated, forming part of the projector and engaging the periphery of the wheel 7 so as to ensure the rewinding of the film. During said rewinding, the pusher member exerts again a pressure on the release member 41 of the slider 14, so as to release the wheel 7 and the film F. The slider 14 is again held fast in the position thus assumed through the engagement of the end 37 of the steel wire inside the notch 38. The rewinding may be executed at a high speed during the major duration of said operation, but the speed should be reduced at the end of the latter. The end of the film is cut along its edge so as to show a reduced breadth. When said narrower end passes in front of the feeler 31, the latter returns into its original position and causes the steel wire to pivot, so that the end of the wire again releases the slider 14. The movement of said slider produces under the action of the elastic blade 24 a rotation of the shoes 22 and 23 so as to again lock the wheel 7 and the end of the film. Said locking is a speedy matter by reason of the clamping obtained by the suitably shaped shoes 22 and 23.

The second embodiment illustrated in FIGS. 7 and 8 is much simpler in its structure than that which has just been disclosed. However, it includes the chief components of the latter, to wit: a casing constituted by two sections 1 and 2 and adapted to enclose a film spool 10. Said spool is fitted on a hub 51 rigid with the wheel 52 and secured to the end of a shaft 53 carrying a further wheel 54 located, outside the casing, inside a recess 55 of a triangular shape formed in the section 1 of the casing. Said wheel has a periphery of a substantially V-shaped cross-section engaging a groove of a corresponding shape in a wheel 56 of a larger diameter revolving on a pivot 57 formed by a boss on the section 1 of the casing.

Inside the casing, a lever 58 provided with a slot 59 is fitted over a stud 60 rigid with the section 1, so that said lever may rock and slide with reference to said stud 60. Said lever is coupled at 61 to a lever 62 pivotally carried in its turn by a stud 63 rigid with the section 1.

The lever 58 is provided with a nose 64 adapted to cooperate with the wheel 52 so as to brake the latter while its other end is provided with a further nose 65 adapted to urge the film against a boss 66 formed on the wall of the section 1. The nose 65 is urged against the boss 66 by a spring which is not illustrated and which may be constituted for instance by a clamping spring fitted on the stud 61 and acting on the lever 62.

The magazine also includes an idle roller 67 of which the spindle 68 is secured to a projection 69 on the section 1. Said roller is located in proximity with an opening 50 provided in the lower part of the casing, as in the case of the first embodiment.

In this second embodiment, which is much simpler than the first one, no means are provided for holding the braking mechanism in its released position, so that the pusher member on the projector, which member is adapted to act on the lever 62, has to exert a pressure on said lever throughout the duration of the projection. Under the action of said pusher member, the lever 62 pivots and raises the lever 58 of which the noses 64 and 65 move away from the wheel 52 and from the boss 66 respectively. The film may thus be unwound off the spool 10 during the projection without any effort being exerted.

During the starting of the projector, the film end does not move out of the magazine casing and the film is first shifted by means of a roller provided on the projector, which enters the opening 50 in the casing and clamps the film against the roller 67.

During the rewinding, the pusher member on the projector has to keep urging the lever 62 into its releasing position, except at the very last moment. The lever 62 being then released, the nose 64 engages the wheel 52 which revolves counterclockwise when considered as seen in FIG. 7. The stress thus exerted by the wheel 62 on the lever 58 urges the latter against the boss 66 which provides a high frictional force on the end of the film which is clamped between said boss and the nose 65 on the lever.

It also should be noted that the pivotal connection between the levers 58 and 62 is ensured with a clearance, so that if the film end passes slightly out of the casing and it is drawn out inadvertently, the nose 65 has a tendency to be shifted together with the film, while the lever 68 pivots slightly round the stud 60. This results consequently in an increased pressure of the nose 64 against the wheel 52 and simultaneously, by reason of the shape given to the nose 65, the pressure between the latter and the wall of the casing section 1 is increased. This leads to an excellent securing of the film inside the magazine.

In this second embodiment, it is necessary for the projector wheel which is in contact with the wheel 56, so as to control the rewinding, to exert a sufficient pressure on said wheel 56 for the latter to be driven by it. Obviously, according to a modification, the wheels 54 and 56 may be toothed and cooperate with a pinion forming part of the projector, so as to cut out the necessity of exerting a minimum pressure between the wheel of the projector and the casing wheel so as to ensure the drive of the spool 10.

FIG. 9 illustrates a further modification according to which the wheel 54 disclosed with reference to the second embodiment is formed by a grooved wheel, whereas the wheel 56 is cut out. In such a case, the casing carries two further wheels 70 and 71 engaging a belt 72 adapted to control the wheel 54 and of which the path is substantially triangular. The spool 10 is driven into rotation for rewinding purposes through the agency of a wheel of the projector which engages the lower rectilinear side 73 of the belt 72.

In a modification of the arrangement illustrated in FIG. 7, the roller 67 may be replaced by a more pressure-exerting shutter, preferably of an arcuate shape, so as to mate with the curvature of the driving roller 45 (FIG. 3) of the projector, said shutter urging the film against said roller carried by the projector.

What I claim is:

1. A magazine carrying a film spool and adapted to be fitted on a kinematographic projector provided with a pivotally carried roller, said roller adapted to engage the film on said spool when the magazine is in position on the projector and to urge the film out of the magazine, said projector also provided with a pusher member, said magazine comprising a casing adapted to be removably fitted on the projector, a spool revolvably carried by said casing, locking means carried by the casing and normally locking the spool against rotation, said locking means including a release member urged into operative position by engagement with said pusher member of the projector and adapted to automatically release the spool locking means upon fitting of the casing on the projector, guide means carried by the casing and guiding the free end of the film wound on the spool, a shoe normally holding said free end of the film against movement in its guide means and released by actuation of said release member simultaneously with release of the spool locking means, a feeler member mounted on the casing and bearing against the film so as to be subject to displacement due to tensioning of the film, latch means carried by said feeler for retaining the release member in its operative position, the tensioning of the film at the end of its projection urging the projector roller which is in engagement therewith into an inoperative position and releasing the feeler and the latch means carried by the feeler to thereby allow the release member of said locking means to return to its inoperative position whereby said spool is locked against rotation.

2. A magazine according to claim 1 including a resilient blade adjacent said feeler member and latch means and engaging said spool locking means to normally urge said last-mentioned means into inoperative position when said feeler and latch means are released.

References Cited

UNITED STATES PATENTS

| | | | |
|---|---|---|---|
| 1,685,010 | 9/1928 | Thornton | 242—71.1 |
| 2,584,733 | 2/1952 | Owens | 242—55.13 |
| 3,070,322 | 12/1962 | Razis | 242—55.13 |
| 3,154,261 | 10/1964 | Breuning | 242—55.13 |
| 3,169,721 | 2/1965 | Laa et al. | 242—55.13 |

GEORGE F. MAUTZ, *Primary Examiner.*